Sept. 8, 1942.     F. BLESSING     2,295,072
LAWN TRIMMER
Filed June 25, 1941
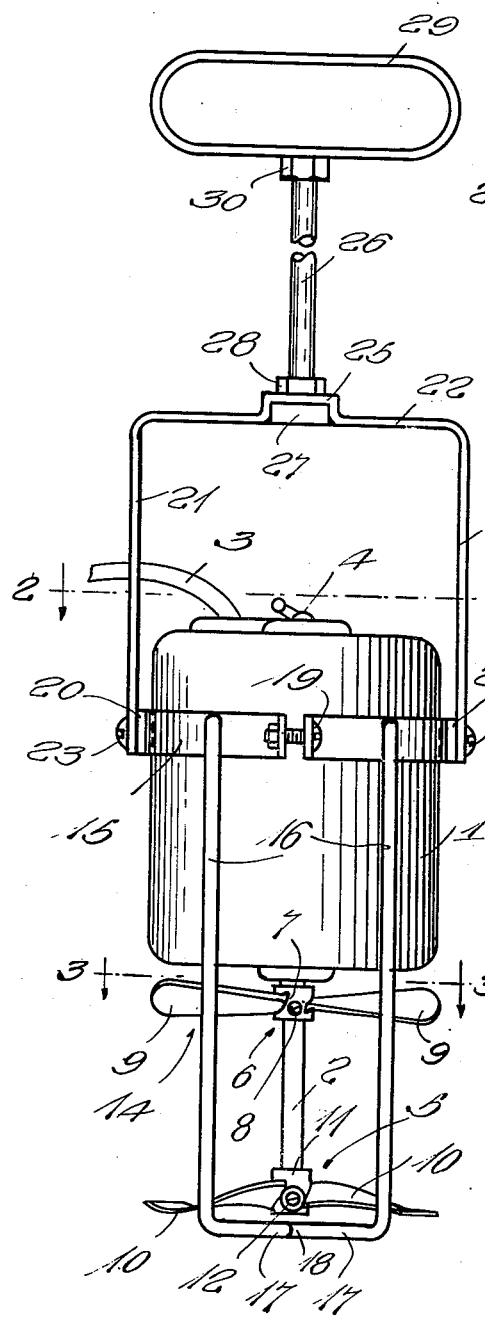
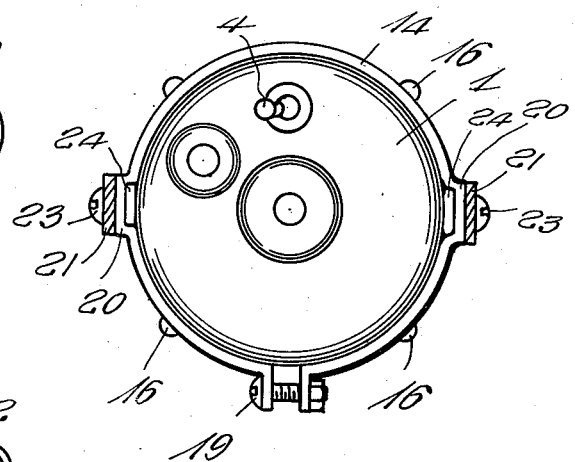
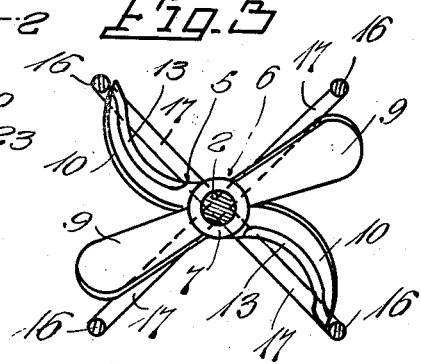
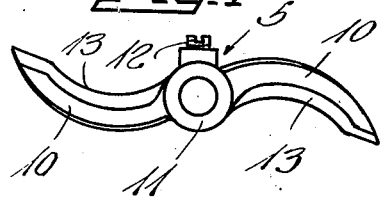
Inventor
Frank Blessing
By
Glenn L. Fish
Attorney Patented Sept. 8, 1942

2,295,072

UNITED STATES PATENT OFFICE 2,295,072

LAWN TRIMMER

Frank Blessing, Spokane, Wash.

Application June 25, 1941, Serial No. 399,723

6 Claims. (Cl. 56—25.4)

This invention relates to a lawn trimmer and it is one object of the invention to provide a trimmer by the use of which grass along edges of lawns may be very easily clipped and a neat appearance imparted to the lawn.

Another object of the invention is to provide a lawn trimmer including an electric motor having an elongated shaft carrying a cutter at its lower end and also carrying a rotary fan which turns with the motor shaft and is disposed over the cutter so that when the trimmer is in use, grass will be drawn upwardly by an air current and thus moved into such position that it may be easily cut by the rotary cutter carried by the motor shaft.

Another object of the invention is to provide a rotary cutter having blades so formed that they assist in creating an air current for drawing the grass upwardly as well as constituting means for cutting the grass.

Another object of the invention is to provide a lawn trimmer wherein a frame is associated with the motor and the cutter, the frame being shiftable longitudinally of the motor so that its lower end may be disposed in predetermined spaced relation to the cutter at the lower end of the motor shaft and, by resting upon the ground, regulate the length of the grass after it has been cut.

Another object of the invention is to provide the lawn trimmer with a handle so connected with a motor-gripping clamp of the frame that the handle may be tilted to adjusted positions between a vertical position and a horizontal position according to the desire of the user of the trimmer.

In the accompanying drawing:

Fig. 1 is a side elevation of the improved lawn trimmer.

Fig. 2 is a view on the line 2—2 of Fig. 1.

Fig. 3 is a transverse sectional view on the line 3—3 of Fig. 1.

Fig. 4 is a top plan view of the cutter.

This improved lawn trimmer has an electric motor 1 which is of conventional construction and has an elongated shaft 2 protruding from one end. A conductor cord 3 extends from the other end of the motor for engagement with a source of current and there has also been provided a switch 4 at this end of the motor. At the free or lower end of the shaft is mounted a rotary cutter 5 and close to the motor the shaft carries a rotary fan 6. The fan 6 has a hub 7 which is fixed to the shaft by a set screw 8 and from this hub extends a suitable number of blades 9 which are so pitched that when the trimmer is disposed vertically and moved along the edge of a lawn, the draft created by the rapidly rotating fan will draw the grass upwardly to a position for engagement by the blades 10 of the cutter 5. The cutter has a hub 11 from which its blades extend and the hub is fixed to the lower end of the shaft by a set screw 12. The blades are sharpened along their lower edges to provide cutting edges 13 and the pitch of the blades is such that they serve as fan blades and assist the blades of the fan 6 in creating an updraft of air to draw the grass upwardly into position for cutting by their sharpened edges.

About the motor is mounted a frame 14 consisting of a clamping ring 15 carrying rods 16 which project downwardly from the motor and have inwardly extending lower portions or arms 17 welded to each other, as shown at 18. The arms 17 are of such length that the blades of the fan and the cutter may freely rotate without striking the rods. It should also be noted that the arms form a head for the lower end of the frame 14. When the device is in use, this head is set upon the ground and the distance between the head of the frame and the blades of the cutter controls the length of the grass after said grass has been cut by the blades. By loosening the bolt 19 and shifting the ring or collar 15 along the motor, the distance between the cutter and the head of the frame may be varied to vary the length of the grass after a trimming operation.

Portions of the collar or ring 15 are bent outwardly to form offsets 20 to which the arms 21 of a yoke 22 are secured by bolts 23 having nuts 24 at their inner ends which are seated in the offsets, as shown in Fig. 2. The bridge of the yoke is bent midway its length to form an upwardly extending offset 25 through which the threaded lower end of a handle 26 passes. This handle is provided with a securing nut 27 at its lower end and also carries a clamping nut 28 which bears against the upper face of the offset 25 and prevents the handle from working loose. At its upper end the handle is provided with a hand grip 29 secured by a nut 30 which holds the hand grip in engagement with the handle and maintains it parallel to the bridge of the yoke. The handle may be disposed in the upright position shown in Fig. 1, in which it is customarily used, or, by loosening the bolts 23, the handle may be swung downwardly toward horizontal position for use in clipping grass in places which cannot be conveniently reached when the handle is in its upright position.

Having thus described the invention, what is claimed is:

1. A lawn trimmer comprising a motor having an elongated shaft extending from one end, a rotary cutter carried by the shaft at the free end thereof, a fan carried by said shaft adjacent the motor, a frame having a clamping ring secured about the motor and shiftable along the motor to adjusted positions, rods carried by said ring and extending longitudinally of the motor in spaced relation to each other circumferentially of the ring, said rods projecting from the motor in spaced relation to the shaft and the fan and the cutter and having arms extending inwardly and united beyond the free end of the shaft, said ring having outwardly offset portions forming internal recesses, a yoke having arms and a bridge, bolts passing through the arms and the offset portions of the ring with their securing nuts seated in the recesses, an upwardly extending offset portion midway the length of the bridge, a handle bar having its lower end passing through an opening in the offset of the bridge and secured by nuts clamping the offset portion of the bridge between them, and a hand grip carried by the upper end of the handle bar, said fan having blades pitched to draw grass upwardly into position for cutting engagement by the cutter, and the cutter having blades pitched to provide an auxiliary fan and sharpened along lower side edges.

2. A lawn trimmer comprising a motor having an elongated shaft extending from its lower end, a rotary cutter at the lower end of the shaft, a rotary fan carried by the shaft in vertical spaced relation to said cutter and having cutting blades pitched to form auxiliary fan blades for drawing grass upwardly into position for cutting engagement by the cutter, a frame mounted about the motor and having a portion projecting from the lower end of the motor in shielding relation to the shaft and the fan and the cutter carried thereby, said frame being shiftable along the motor to dispose its lower end in predetermined spaced relation to the lower end of the shaft and regulate the length of grass cut by the cutter when the trimmer is in use and disposed vertically with the lower end of the frame resting upon the ground, and a handle connected with the frame for supporting the trimmer in upright position.

3. A lawn trimmer comprising a motor having an elongated shaft extending from its lower end, a rotary cutter at the lower end of the shaft, a rotary fan carried by the shaft in vertical spaced relation to said cutter and shiftable along the shaft to adjusted positions, the fan having blades pitched to draw grass upwardly into position for cutting engagement by the cutter, the cutter having blades pitched to provide an auxiliary fan and sharpened along their lower side edges, a frame carried by said motor and being shiftable along the motor to adjusted positions and having a portion extending from the motor about the shaft and the fan and the cutter carried thereby with its lower end projecting beyond the shaft and cutter for engagement with the ground.

4. A lawn trimmer comprising a motor having an elongated shaft extending from its lower end, a rotary cutter at the lower end of the shaft, a rotary fan carried by the shaft in vertical spaced relation to said cutter and having blades pitched to draw grass upwardly into position for cutting engagement by the cutter, a frame carried by the motor and shiftable along the same to adjusted positions, said frame projecting from the lower end of the motor about the shaft and the fan and cutter carried thereby with its lower end disposed beyond the shaft and the cutter for engagement with the ground, a yoke, carried by the frame and pivotally mounted for swinging movement from a vertical position over the motor toward a lowered position, the yoke having a bridge formed with an internal recess, a handle bar having its lower end threaded and passing through the recessed portion of the bridge, and a nut carried by the lower end of the handle bar and seated in the recess.

5. A lawn trimmer comprising a motor having an elongated shaft extending from its lower end, a rotary cutter at the lower end of the shaft, a rotary fan carried by the shaft in vertical spaced relation to said cutter and having blades pitched to draw grass upwardly into position for cutting engagement by the cutter, a frame carried by the motor and shiftable along the same to adjusted positions, said frame projecting from the lower end of the motor about the shaft and the fan and cutter carried thereby with its lower end disposed beyond the shaft and the cutter for engagement with the ground, the frame having outwardly offset portions defining internal recesses between the frame and the motor, a yoke having a bridge and arms extending from ends of the bridge, bolts passing through the arms and the offset portions of the frame and having nuts seated in the recesses, said bolts constituting pins pivotally mounting the frame for swinging adjustment from a vertical position over the motor toward a lowered position, and a handle carried by the bridge and extending from the bridge longitudinally of the yoke.

6. A lawn trimmer comprising a motor having an elongated shaft extending from one end, a rotary cutter carried by the shaft, a fan carried by said shaft above the cutter, a frame having a clamping ring secured about the motor and shiftable along the motor to adjusted positions, rods carried by said ring and extending longitudinally of the motor and projecting from the motor in spaced relation to and beyond the free end of the shaft for engagement with the ground, said ring having portions formed with internal recesses, a yoke having arms and a bridge, bolts passing through the arms and the ring with their securing nuts seated in the recesses, and a handle bar having its lower end passing through an opening in the bridge and secured by nuts clamping the bridge between them, said fan having blades pitched to draw grass upwardly into position for cutting engagement by the cutter.

FRANK BLESSING.